Patented June 22, 1954

2,681,875

UNITED STATES PATENT OFFICE 2,681,875

METHOD OF MAKING AN ARC WELDING COMPOSITION

Leonidas Keever Stringham, Shaker Heights, and Theodore Ashton, East Cleveland, Ohio, assignors to The Lincoln Electric Company, Cleveland, Ohio, a corporation of Ohio No Drawing. Application August 10, 1949, Serial No. 109,631

5 Claims. (Cl. 148—23)

The present invention, relating as indicated to compositions for use in arc welding, has more particular regard to so-called flux compositions designed to be placed on the work in the course of an arc welding operation in order to provide a protective blanket over the pool of molten metal which results from such operation.

Until recently preformed or prefused silicate compounds such as the manganese silicate disclosed in Patent No. 1,754,566 to W. B. Miller, dated April 15, 1930, have been found most satisfactory for the indicated purpose. However, there has more recently been perfected an improved flux composition as disclosed in Patent No. 2,474,787 to G. G. Landis et al., dated June 28, 1949, in which the flux ingredients, consisting essentially of one or more metallic oxides and silica in amount approximately that required to combine with such oxides to form corresponding silicates are agglomerated by means of a suitable binder, e. g. substantially anhydrous water glass, in uniformly distributed condition throughout the granular free flowing particles which form the welding material. As described in the patent, in order to form the material the flux ingredients in dry finely ground state are intermixed with water glass solution in amount approximately the minimum required to agglomerate said ingredients; thereupon the resulting mass is dried to render the same substantially anhydrous; and finally such dried mass is reduced to the form of the desired granular free flowing particles. It is indicated that the mass may be thus dried at from 700° F. to 1200° F. until substantially anhydrous.

We have now discovered that instead of initially agglomerating the flux ingredients with water glass solution, equally effective agglomeration may be secured by intermixing with the flux ingredients proper the requisite amount of anhydrous water glass (specifically sodium silicate) and by then heating the mixture to a somewhat higher temperature than indicated above but still well below the temperature at which reaction between the metal oxides and silica will occur, the binder in question which has a substantially lower melting point, may be brought at least to an incipient state of fusion and thus serve to agglomerate the flux ingredients, all without requiring the introduction of water at any stage in the operation.

We have further discovered that the requisite amount of anhydrous sodium or potassium silicate may, in effect, be produced in situ by introducing into the mixture of flux ingredients a relatively small amount either of the corresponding carbonate or hydroxide and including in the flux ingredients sufficient excess silica to react with such carbonate or hydroxide, when the mixture is heated at a temperature such as just indicated.

The following description, accordingly, sets forth in detail certain products and methods for making the same which exemplify the present improvements; such disclosed products and procedures for making the same constitute, however, several of the various applications of the principle of the invention.

As in the case of the compositions disclosed in the above cited Patent No. 2,474,787, the flux ingredients proper, which are agglomerated to produce the present improved flux composition or arc welding material, may vary considerably. Thus a preferred composition will contain a major proportion of finely ground manganese oxide and silica, the latter in excess of the ratio present in manganese silicate, and a relatively small amount of a metallic fluoride, e. g. calcium fluoride or fluorspar, although aluminum fluoride, sodium aluminum fluoride, or sodium fluoride may be employed. In addition, there will desirably be included a small amount of a so-called "killing agent," e. g. ferro-silicon, ferro-manganese, or silico-manganese, or a mixture of two or more such agents.

The following is a typical formula embodying the foregoing flux ingredients (including the anhydrous water glass binder) which has been found highly satisfactory in use, viz.:

| | Per cent |
|---|---|
| Roasted manganese ore | 42.6 |
| Silica | 42.6 |
| Fluorspar | 3.3 |
| Silico-manganese | 4.4 |
| Sodium silicate (anhydrous) | 7.1 |

The foregoing ingredients are intermixed in dry, finely ground state and the mixture then heated to a temperature of from 1900° F. to 2100° F., whereby the sodium silicate is fused sufficiently to agglomerate the other ingredients in uniformly distributed condition. Thereupon the resulting agglomerated mass is crushed to approximately 12 x 120 mesh, the particles of the final product being substantially larger than the finely ground entering ingredients, and the latter being uniformly distributed throughout such particles.

According to another example, approximately the same proportionate amounts of flux ingredients proper are intermixed with 2% of sodium carbonate instead of anhydrous sodium silicate, the amount of silica included as one of the flux ingredients being increased sufficiently to provide an excess thereof for reaction with such sodium carbonate to form sodium silicate. Upon heating the mixture thus provided to a temperature which may be several hundred degrees lower than that previously indicated, the sodium carbonate is decomposed, yielding free carbon dioxide which escapes and sodium oxide which thus combining with the silica provided for the purpose produces sodium silicate in situ in incipient state of fusion, which serves to agglomerate the other ingredients in uniformly distributed condition. The resulting mass is then ground just as before to the form of granular free flowing particles.

It is not necessary that the sodium carbonate be entirely decomposed since we have obtained satisfactory results with a flux composition in which the amount of carbon dioxide retained is less than 10% of the amount in the sodium carbonate originally introduced. One advantage in thus using sodium carbonate as the source of the binder is that we have found the particles of the flux ingredients proper may be satisfactorily agglomerated at a substantially lower temperature than where anhydrous sodium silicate as such is employed as the bonding agent.

According to still another example, approximately the same proportionate amounts of flux ingredients proper are intermixed with sodium hydroxide in place of the anhydrous sodium silicate or sodium carbonate specified in previous examples. As before, the amount of silica included as one of the flux ingredients will be increased sufficiently to supply an excess thereof for reaction with such sodium hydroxide to form sodium silicate. While the amount of sodium hydroxide, like that of sodium carbonate, may vary, it is desirable to employ no more than necessary and we have found that an amount that corresponds in sodium content with that of the sodium carbonate used in the preceding example will give satisfactory results.

The manganese ore employed in the foregoing formulas is a naturally occurring mineral, which consists in major proportion of manganese dioxide, together with small amounts of other compounds, e. g. silicate, pyrite, etc. as impurities. The object of the roasting is to reduce the available oxygen, as well as whatever sulphur or sulphur compound, e. g. pyrite, may be found present in such ore. In place of manganese ore, treated in the manner described, we may employ an equivalent amount of commercial manganese oxide, it being understood that this term connotes either the monoxide or dioxide, or a mixture of the two.

The silica used is a high grade relatively pure silica sand, and where ore is used and it contains a consequential amount of silica, the amount of the latter thus added will be correspondingly reduced.

For certain purposes it may be found satisfactory to replace a portion of the manganese oxide by iron oxide or aluminum oxide (alumina), calcium oxide (lime), magnesium oxide (magnesia), or titanium oxide (rutile). Also instead of the major proportion of the flux ingredients consisting of manganese oxide or such other metallic oxide and silica, the main body may consist of preformed silicates (either naturally occurring or synthetic) in which one or more of such oxides are already combined with the silica.

Thus ordinary asbestos which is principally magnesium silicate, or blue asbestos which is principally ferro-silicate, or clay which is principally aluminum silicate, or nephelite which is principally sodium potassium aluminum silicate, may be used to form the present improved flux composition. The foregoing are examples of naturally occurring silicates; examples of synthetic silicates which may be used are acid open hearth slag and Portland cement which actually consist of a mixture of silicates, as is for that matter true of most naturally occurring silicates.

Such silicates in finely ground condition will be intermixed with fluorspar or other metallic fluoride and with ferro-silicon, ferro-manganese, or other equivalent killing agent in approximately the amounts given in previous examples, and there will also be included in such mixture, in the amount previously indicated, either anhydrous sodium silicate, sodium hydroxide, or sodium carbonate in which latter case there should sufficient free silica present to react with such carbonate to form sodium silicate in situ when the mixture is heated as hereinbefore set forth. In any case the resulting agglomerated mass is crushed or otherwise reduced to the form of granular free flowing particles in which the flux ingredients proper remain present as such but in uniformly distributed condition throughout the particles.

As set forth in the co-pending application of George G. Landis and Emmett A. Smith, filed March 2, 1949, Ser. No. 79,298, a welding material or flux composition such as is described in the previously cited Patent No. 2,474,787, in which the flux ingredients proper are thus agglomerated by means of a suitable anhydrous binder, may also be utilized as a base for an alloying flux composition where it is desired to alloy or otherwise modify the weld metal by adding thereto selected metallic ingredients. Similarly in making up the present improved flux small amounts of such modifying or alloying ingredients may be included in making the agglomerated mass and thus in the particles which constitute the final product. For example, in order to obtain a weld deposit of high tensile strength 3% of 65% ferro-molybdenum and ½% of 50% ferro-vanadium, both in dry finely ground state, may be included with the flux ingredients proper prior to their being thus agglomerated. In another example of such an alloying flux 3% of 70% ferro-chromium, 2% of 80% ferro-manganese, and ½% of carbon may be similarly added. In still another example, where the deposited weld metal is to be put on as a surface coating only, the addition to the base flux may consist of 22% of 70% ferro-chromium, 5% of 80% ferro-manganese and 3% of carbon.

As indicated, such alloying ingredients will in all cases be finely ground and uniformly mixed with the flux ingredients proper, including the sodium silicate binder. It will furthermore be understood that the temperature to which the mixture is heated in order to agglomerate the flux and alloying ingredients together will not be so high as to cause said ingredients to react with each other. In other words, the alloying ingredients, equally with the flux ingredients, will be carried as such, in uniformly distributed condition, in the individual particles which constitute the form in which the material is used in the welding operation.

The term "flux ingredients" as used herein will be understood to connote a flux ingredient selected from the class consisting of manganese, calcium, magnesium and aluminum silicates and of silicate-forming components, namely manganese oxide and silica and calcium, aluminum, titanium and iron oxides and calcium and magnesium carbonates, together with manganese oxide and silica, in approximately combining ratios.

While sodium silicate will generally be utilized as the binding agent, potassium silicate, although more expensive, is entirely satisfactory, and the term "water glass" is employed herein to connote both such silicates whether introduced as such or produced in situ by reaction between silica and either potassium carbonate or hydroxide.

While the bonding of the flux ingredients by the water glass (sodium or potassium silicate), whether such binder be introduced as such or produced in situ, is carried out under substantially anhydrous conditions, it will be understood that this does not preclude the use of water in the preliminary mixing stage. In fact, particularly in using sodium carbonate to form the binder, we have found it advantageous in practice to dissolve the same in a small amount of water before adding it to the mixture of other ingredients, inasmuch as this prevents segregation and dusting during manufacture. Furthermore, by thus dissolving the carbonate in water we find that we can obtain proper bonding with less carbonate than if it were added dry. The slight amount of water employed will of course be driven off early in the heating stage, and the agglomeration of the finely ground flux ingredients will then follow as the temperature is raised.

As previously indicated, while the final temperature should be above the point of incipient fusion of the binder, it will be kept below the fusion point of the other ingredients. In other words, the particles which comprise the finished product will not fuse together even if heated to the maximum temperature to which they were heated in the course of producing the composition.

Other modes of applying the principle of our invention may be employed instead of the one explained, change being made as regards the process herein disclosed or the materials employed in carrying out the process, provided the steps or ingredients stated by any of the following claims or the equivalent of such stated steps or ingredients be employed.

We therefore particularly point out and distinctly claim as our invention:

1. In a method of making a flux composition suitable for use in arc welding, the step which comprises heating an intermixture of dry, finely ground welding flux ingredients together with a relatively small amount of sodium carbonate, such ingredients including silica in amount available for dry reaction with such carbonate, to the temperature of such reaction, whereby sodium silicate in incipient state of selective fusion is produced in situ and serves to agglomerate the other ingredients in unreacted and uniformly distributed condition.

2. In a method of making a flux composition suitable for use in arc welding, the steps which comprise heating an intermixture of dry, finely ground welding flux ingredients together with a relatively small amount of sodium carbonate, such ingredients including silica in amount available for dry reaction with such carbonate, to the temperature of such reaction, whereby sodium silicate in incipient state of selective fusion is produced in situ and serves to agglomerate the other ingredients in unreacted and uniformly distributed condition, and then grinding the resulting mass to the form of granular, free flowing particles.

3. In a method of making a flux composition suitable for use in arc welding, the step which comprises heating an intermixture of dry, finely ground welding flux ingredients together with approximately 2% by weight of sodium carbonate, such ingredients including silica in amount available for dry reaction with such carbonate, to the temperature of such reaction, whereby sodium silicate in incipient state of selective fusion is produced in situ and serves to agglomerate the other ingredients in unreacted and uniformly distributed condition.

4. In a method of making a flux composition suitable for use in arc welding, the steps which comprise heating an intermixture of dry, finely ground welding flux ingredients together with approximately 2% by weight of sodium carbonate, such ingredients including silica in amount available for dry reaction with such carbonate, to the temperature of such reaction, whereby sodium silicate in incipient state of selective fusion is produced in situ and serves to agglomerate the other ingredients in unreacted and uniformly distributed condition, and then grinding the resulting mass to the form of granular, free flowing particles.

5. In a method of making a flux composition suitable for use in arc welding, the step which comprises heating, an intermixture of dry, finely ground welding flux ingredients together with a relatively small amount of binder selected from the class consisting of sodium carbonate, potassium carbonate, sodium hydroxide and potassium hydroxide, such ingredients including silica in an amount available for dry reaction with such binder, to the temperature of such reaction whereby a silicate of the class of sodium or potassium in incipient state of selective fusion is produced in situ and serves to agglomerate the other ingredients in unreacted and uniformly distributed condition.

References Cited in the file of this patent

UNITED STATES PATENTS

| Number | Name | Date |
|---|---|---|
| 108,138 | Hindemeyer | Oct. 11, 1870 |
| 1,618,818 | Ehlers | Feb. 22, 1927 |
| 1,818,070 | Lathrop | Aug. 11, 1931 |
| 2,150,000 | Lair | Mar. 7, 1939 |
| 2,223,230 | Shepherd | Nov. 26, 1940 |
| 2,282,175 | Emerson | May 5, 1942 |
| 2,460,988 | Koopman | Feb. 8, 1949 |
| 2,474,787 | Landis et al. | June 28, 1949 |
| 2,481,479 | Ter Berg et al. | Sept. 6, 1949 |